Sept. 7, 1937.  E. F. W. ALEXANDERSON  2,092,545
ELECTRIC VALVE TRANSLATING CIRCUIT
Original Filed Feb. 29, 1936   2 Sheets-Sheet 1
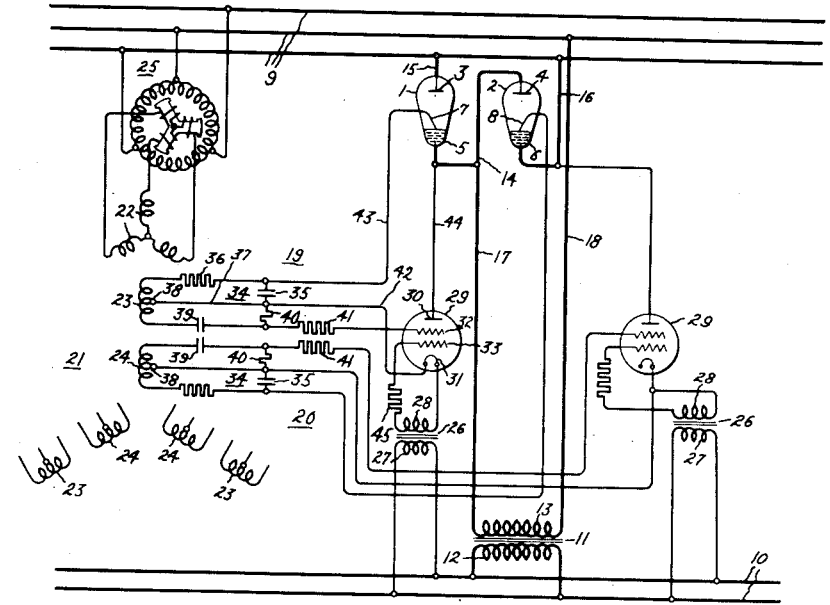
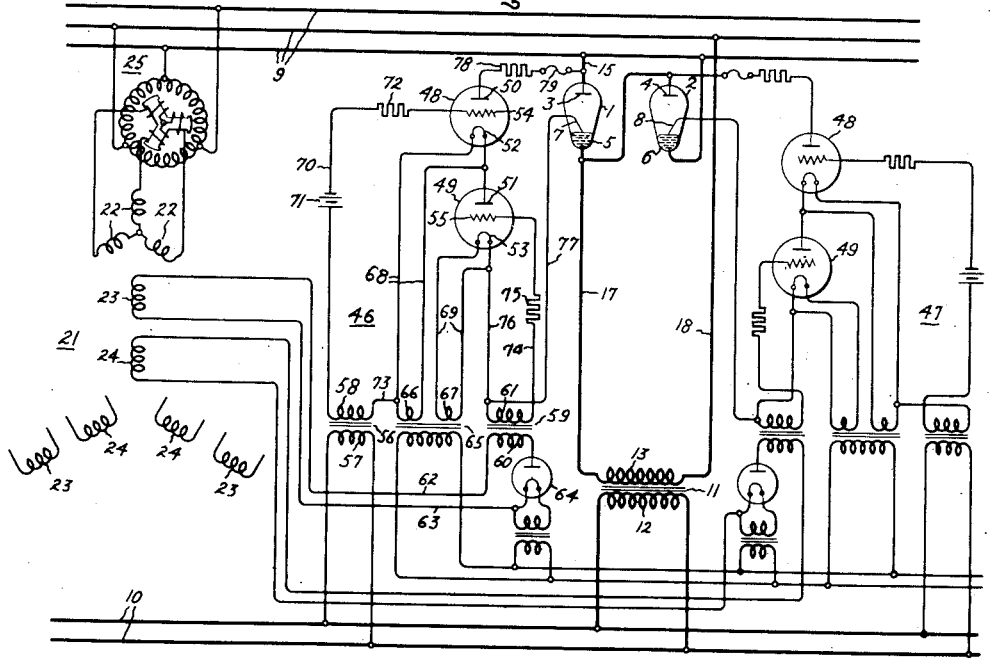
Inventor:
Ernst F. W. Alexanderson,
by Harry E. Dunham
His Attorney.

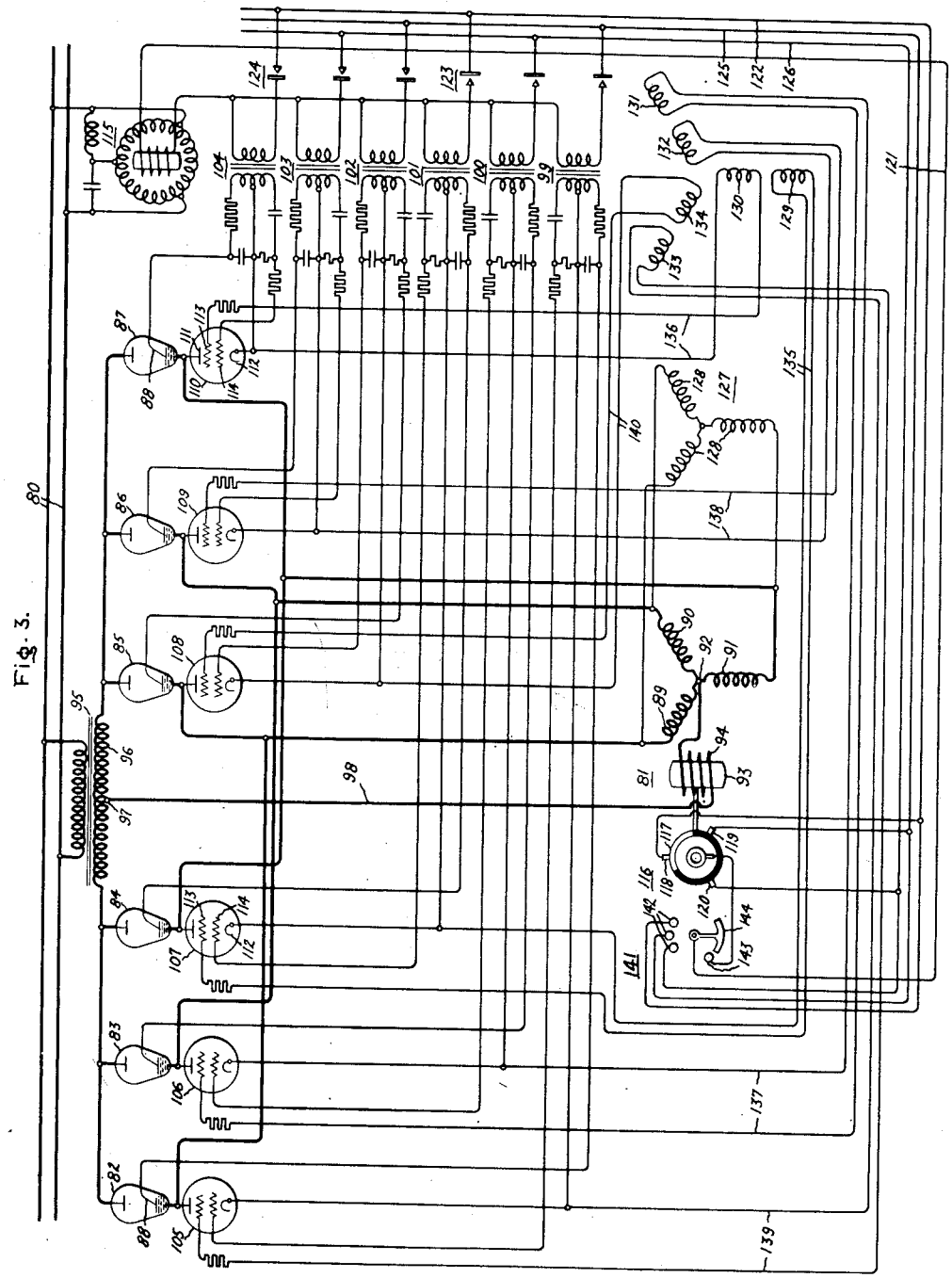

Patented Sept. 7, 1937

2,092,545

UNITED STATES PATENT OFFICE 2,092,545

ELECTRIC VALVE TRANSLATING CIRCUIT

Ernst F. W. Alexanderson, Schenectady, N. Y., assignor to General Electric Company, a corporation of New York Original application February 29, 1936, Serial No. 66,433. Divided and this application November 21, 1936, Serial No. 112,041

9 Claims. (Cl. 172—281)

My invention relates to electric valve translating circuits and more particularly to control circuits for electric valve translating apparatus.

This application is a division of my application Serial No. 66,433, filed February 29, 1936, entitled "Electric valve translating circuits", and assigned to the assignee of the present application.

Heretofore there have been devised many arrangements for controlling the energization of electric valve apparatus in accordance with a combination of electrical conditions. For example, in electric valve frequency changing systems the auxiliary control apparatus has been cumbersome and complicated. In many electric valve translating systems employing electric valves to obtain a frequency transformation, the conductivity of the valves has been controlled by mechanical means such as commutators or distributors acting in conjunction with electrical control means. While these systems have proved satisfactory in many applications, there has been evidenced a decided need for control apparatus entirely electrical in nature for controlling the conductivity of electric valve means in accordance with a number or combination of electrical conditions.

It is an object of my invention to provide a new and improved electric valve translating circuit.

It is another object of my invention to provide new and improved electric valve control circuits for controlling electric valve translating circuits.

It is a further object of my invention to provide improved circuits for controlling electric valve frequency changing circuits.

In accordance with the illustrated embodiments of my invention, I provide electric valve converting systems controlled by excitation circuits entirely electrical in nature and in operation for controlling the conductivity of associated electric valve means in accordance with a number of different predetermined electrical conditions. In accordance with one feature of my invention, I employ a control electronic discharge device having at least two control members or electrodes for controlling the conductivity of the main power electric valve means in accordance with a combination of electrical conditions. The control members of the electronic discharge devices are energized in accordance with at least two separate electrical conditions of an associated circuit, or circuits, to control the conductivity of the control discharge device and hence to effect control of the conductivity of the main electric valve means. The control electronic discharge device is so constructed and arranged that the control members act conjointly to effect control of the conductivity of the discharge device. That is, the discharge device remains nonconductive until voltages of predetermined minimum values are impressed upon the respective control members. The control discharge device may be maintained non-conductive by impressing a suitable negative potential upon either of the control members.

In accordance with another embodiment of my invention, instead of employing a plurality of control members in a single valve, I provide an excitation circuit comprising two serially-connected electronic discharge devices each having a single control member for effecting control of the conductivity of an electric valve of the gaseous type having an immersion-ignitor control member. The excitation circuit comprising the serially-connected electronic devices is energized in response to the voltage appearing across the anode and the cathode of the main electric valve. Each of the serially-connected electronic discharge devices is energized in response to predetermined different electrical conditions of the same or different circuits. When the predetermined electrical conditions are satisfied both electronic discharge devices are rendered conductive to effect energization of the control circuit for the main electric valve. So long as these electrical conditions are met, the excitation circuit will impress periodically suitable potentials upon the control member of the main electric valve and conversely when either, or both, of the predetermined electrical conditions depart from a predetermined range, or change in character, one or both of the control devices will be rendered non-conductive to interrupt the control circuit for the main electric valve.

In accordance with a further embodiment of my invention, I provide an improved excitation circuit entirely electrical in nature and operation for controlling the conductivity of electric valve translating apparatus for transmitting energy between alternating current circuits of the same or different frequencies. The excitation circuit may comprise a plurality of electronic discharge devices, each having a single control member, or it may comprise a single electronic discharge device having a plurality of control members. The conductivity of the control electronic device, and hence the conductivity of the main associated electric valve means, is controlled in accordance with the voltages and hence the frequencies of the respective alternating current circuits which the electric valve translating circuit interconnects. By means of selective energization of the phase windings of the interconnecting translating apparatus, I provide an improved system for establishing electrical rotating fields for either stationary or rotary electrical apparatus.

For a better understanding of my invention, reference may be had to the following description taken in connection with the accompanying drawings and its scope will be pointed out in the appended claims.

Fig. 1 of the drawings, diagrammatically represents an embodiment of my invention as applied to an electric valve translating circuit employing two main power electric valves. An excitation circuit is provided for each of the main electric valves and comprises an electronic discharge device having at least two control members for controlling the conductivity of the main power electric valve in accordance with two electrical conditions. Fig. 2 diagrammatically shows a modification of the embodiment of my invention illustrated in Fig. 1 as applied to a similar electric valve translating system in which the excitation circuit comprising two serially connected electronic devices for each of the main power electric valves is energized in response to the voltage appearing across the anode and the cathode of the associated main electric valve, and Fig. 3 shows a further embodiment of my invention as applied to an electric valve translating circuit for transmitting energy between an alternating current circuit of constant frequency and an alternating current of variable frequency such as a dynamo-electric machine of the synchronous type.

Referring now to Fig. 1 of the accompanying drawings, my invention is diagrammatically illustrated as applied to electric valve converting apparatus for transmitting energy between a three phase alternating current circuit and a single phase alternating current circuit. For the purpose of explaining and illustrating my invention, I have shown electric valves 1 and 2 of the gaseous type having anodes 3 and 4, mercury pool cathodes 5 and 6 and immersion-ignitor control members 7 and 8 for interconnecting a polyphase alternating current supply circuit 9 and a single phase alternating current load circuit 10 through a transformer 11 having a primary winding 12 and a secondary winding 13. The main power electric valves 1 and 2 are oppositely disposed or connected. That is, the cathode 5 of electric valve 1 is connected to the anode 4 of electric valve 2 through a conductor 14, and the anode 3 of electric valve 1 and the cathode of electric valve 2 are connected to the same conductor of the polyphase supply circuit 9 through conductors 15 and 16, respectively. The cathode 5 of electric valve 1 and the anode 4 of electric valve 2 are connected to one side of the secondary winding 13 of transformer 11 through a conductor 17, while the other terminal of the secondary winding 13 is connected to the supply circuit 9 through a conductor 18.

To provide means for controlling the conductivity of electric valves 1 and 2 in accordance with electrical conditions of the supply circuit 9 and the load circuit 10, I employ excitation circuits 19 and 20, respectively. The excitation circuits 19 and 20 are energized from the supply circuit 9 by a transformer 21 having primary windings 22 and secondary windings 23 and 24 through any conventional phase shifting device, such as the rotary phase shifting arrangement 25. Each of the excitation circuits 19 and 20 is energized from a suitable secondary winding of the transformer 21. For example, the excitation circuit 19 for electric valve 1 comprises the secondary winding 23 of transformer 21 for controlling the conductivity of the main electric valve 1 in response to an electrical condition of the supply circuit 9. A transformer 26, which may be of the type to supply a voltage of peaked wave form, having a primary winding 27 and a secondary winding 28, is employed to control the conductivity of electric valve 1 through an electronic discharge device 29, preferably of the gaseous type, in response to an electrical condition of the load circuit 10. By the term "electronic discharge device of the gaseous type" I intend to include electric valves employing any ionizable medium such as a gas or vapor. The electronic discharge device 29 is provided with an anode 30, a cathode 31 and control members 32 and 33 and is employed to correlate the predetermined electrical conditions of the supply circuit 9 and the load circuit 10 to effect the desired periodic energization of electric valve 1 through the control member 7. The control members 32 and 33 of electronic discharge device 29 co-operate to control the conductivity of the device 29 and when suitable voltages above predetermined minimum voltages are impressed upon the respective control members, the device 29 is rendered conductive. However, either or both of the control members 32 and 33 may maintain the electronic discharge device 29 non-conductive if a voltage below a predetermined minimum value is impressed upon either of the control members.

To obtain a voltage of suitable magnitude and wave form for controlling the conductivity of the main electric valves 1 and 2, I employ circuits 34 in the excitation circuits 19 and 20, respectively, for impressing upon the immersion-ignitor control members 7 and 8 voltages in accordance with the desired sequence of operation. The circuits 34 each comprises a capacitance 35 which is periodically charged from the secondary winding 23 through a resistance 36 and a conductor 37 connected to an electrical neutral 38 of secondary winding 23. To impress upon the control member 32 of electronic discharge device 29 a potential of suitable magnitude and phase relation relative to the voltage of the supply circuit 9, I use phase shifting circuit connected between the lower terminal of the secondary winding 23 and the neutral connection 38 comprising a capacitance 39 and resistance 40. A resistance 41 is connected in series with this phase shifting circuit and the control member 32 of electronic discharge device 29. The common connection between capacitance 35 and resistance 40 is connected to the cathode 31 of electronic discharge device 29 by a conductor 42. One terminal of the excitation circuit 19 for the electric valve 1 is connected to the immersion-ignitor control member 7 of electric valve 1 through a conductor 43, and the other terminal of the excitation circuit 19 is connected to the cathode 5 of electric valve 1 through a conductor 44, anode 30 and cathode 31 of electronic discharge device 29 and conductor 42. The right-hand terminal of the secondary winding 28 of transformer 26 is connected to the cathode 31 of electronic discharge device 29 and the left-hand terminal of secondary winding 28 is connected to the control member 33 through a current limiting resistor 45.

In explaining the operation of the embodiment of my invention diagrammatically shown in Fig. 1, let it be assumed that the alternating current supply circuit 9 is of a higher frequency than the alternating current load circuit 10 and that current is being transferred between these two circuits by the interconnected electric valve means 1 and 2. Under the assumed conditions, the electric valve 1 should be rendered conductive, for example, during positive half cycles of the alternating potential of the supply circuit 9 and concurrently during an interval corresponding to a positive half cycle of the potential of the load circuit 10. In other words, the electric valves 1 and 2 will be conductive alternately during alternate half cycles of a relatively higher frequency of the supply circuit 9. During a half cycle of predetermined sign of the potential of the lower frequency circuit 10, electric valves 1 and 2 will alternately conduct current in response to the higher frequency potential of the supply circuit 9 to supply current to the secondary winding 13 of transformer 11. Each of the electric valves 1 and 2 will be rendered conductive intermittently to effect transfer of current from the supply circuit 9 to the load circuit 10 during half cycles of predetermined sign of the lower frequency potential of alternating current circuit 10. For example, the excitation circuit 19 will operate to impress voltage of suitable wave form upon the control member 7 of electric valve 1 in predetermined phase relation with the voltage of the alternating current circuit 9. The capacitance 35 of the circuit 34 will be charged during positive half cycles of alternating potential of circuit 9 by means of the secondary winding 23 of transformer 21. When the electronic discharge device 29 is rendered conductive in response to suitable potentials being impressed upon the control members 32 and 33, the capacitance 35 will discharge through the circuit comprising conductor 43, control member 7 of electric valve 1, conductor 44, electronic device 29, conductor 42, and the capacitance 35. The electronic discharge device 29 will be rendered conductive only during those intervals in which predetermined electrical conditions of the alternating current circuit 9 and the alternating current circuit 10 are satisfied. In this manner, the capacitance 35 will be charged during positive half cycles of the relatively higher frequency of the alternating current circuit 9 and will be discharged during the following half cycles of potential. The polarities of the potentials impressed on the control members 32 and 33 of electronic discharge device 29 by the phase shifting circuit comprising capacitance 39 and resistance 40 and the secondary winding 28 of transformer 26, respectively, determines the instant at which the device 29 is rendered conductive. Since the control members 32 and 33 of device 29 must act conjointly to render the device 29 conductive, the electric valve 1 will be rendered conductive at only those intervals during which it is desired to transmit current from the alternating current circuit 9 to the alternating current circuit 10.

It should be understood that the rotary phase shifting arrangement 25 may be employed to retard the phase of the control potential impressed upon control member 7 by excitation circuit 19 relative to the potential impressed on the anode 3 of electric valve 1. While for the purpose of explaining my invention I have shown two electric valves interconnecting alternating current circuits, it should be understood that my invention in its broader aspects may be applied to electric valve translating circuits generally employing either a single electric valve or a plurality of electric valve means for interconnecting alternating current circuits and direct current circuits, or interconnecting alternating current circuits of the same or different frequencies.

Referring now to Fig. 2 of the drawings, my invention is diagrammatically represented as applied to an electric valve translating circuit similar to the embodiment of my invention shown in Fig. 1 and corresponding elements have been assigned like reference numerals. Any suitable electric valve aggregate, such as electric valves 1 and 2 of the gaseous type employing an immersion-ignitor control member, is employed for transmitting energy between alternating current supply circuit 9 and alternating current load circuit 10. To control the conductivity of the electric valves 1 and 2 during predetermined intervals, I employ excitation circuits 46 and 47, respectively. Each of the excitation circuits 46 and 47 is energized in accordance with the voltage appearing across the anode and cathode of the respective main power electric valves 1 and 2 and in accordance with predetermined electrical conditions of the supply circuit 9 and the load circuit 10 and each comprises two serially-connected electronic devices 48 and 49, preferably of the gaseous or vapor type, having anodes 50 and 51, cathodes 52 and 53 and control members 54 and 55, respectively.

The conductivity of the electronic device 48 is controlled in accordance with an electrical condition, such as the voltage, of the load circuit 10 through a transformer 56 having a primary winding 57 and a secondary winding 58, and the conductivity of the electronic device 49 is controlled in accordance with an electrical condition, such as the voltage, of supply circuit 9 through a transformer 59 having a primary winding 60 and a secondary winding 61. The transformer 59 is energized from the supply circuit 9 through the rotary phase shifter 25, secondary winding 23 of transformer 21, conductors 62 and 63 and unidirectional conducting device 64. A transformer 65 having secondary windings 66 and 67 is energized from any suitable auxiliary source of alternating potential to energize the cathodes 52 and 53 of electronic devices 48 and 49, through conductors 68 and 69, respectively. A potential which varies in accordance with an electrical condition of the load circuit 10 is impressed across the control member 54 and cathode 52 of electronic device 48 by secondary winding 58 of transformer 56, through a conductor 70, a suitable negative voltage biasing means such as a battery 71, and a current limiting resistance 72, conductors 68 and a conductor 73. A potential, which varies in accordance with an electrical condition of the supply circuit 9, is impressed across the control member 55 and cathode 53 of electronic device 49 by the secondary winding 61 of transformer 59, through a conductor 74 which is connected to the right-hand terminal of winding 61, a current limiting resistance 75, and a conductor 76 which connects the cathode 53 to the left-hand terminal of the secondary winding 61 of transformer 59. The left-hand terminal of the secondary winding 61 of transformer 59 is also connected to the control member 7 of electric valve 1 by a conductor 77. The anode 50 of electronic device 48 is connected to the anode 3 of electric valve 1 through a resistance 78 and any conventional current limiting device, such as a fuse 79.

As explained in connection with the operation of the embodiment of my invention diagrammatically shown in Fig. 1, the embodiment of my invention represented in Fig. 2 may be best explained by considering the operation of the system when the frequency of the supply circuit 9 is greater than the frequency of the load circuit 10. To obtain the desired periodic energization of the electric valves 1 and 2, and hence to control the conductivity of the valves 1 and 2 at predetermined times relative to the polarities of the potentials of circuits 9 and 10, the electronic discharge devices 48 and 49 in each of the excitation circuits 46 and 47 act conjointly to effect energization at these predetermined intervals. Since the conductivity of the electronic device 49 is controlled in accordance with an electrical condition of the supply circuit 9 and since the conductivity of the electronic device 48 is controlled in accordance with an electrical condition of the load circuit 10, to obtain energization of the electric valve 1 and hence to render the associated valve conductive, the electronic devices 48 and 49 must both be conductive during predetermined intervals, or, in other words, these devices must be conductive concurrently to effect energization of the immersion-ignitor 7 by utilizing the potential appearing between anode 3 and cathode 5 of valve 1. During those intervals in which these predetermined conditions are satisfied, electronic devices 48 and 49 will be rendered conductive to effect energization of the immersion-ignitor 7 through a circuit comprising fuse 79, current limiting resistor 78, electronic device 48, electronic device 49, conductor 76 and conductor 77.

It should be understood that while I have described in detail the operation of the excitation circuit 46, the excitation circuit 47 operates in a similar manner to control the conductivity of electric valve 2 during alternate half cycles of the high frequency potential of the alternating current supply circuit 9. Furthermore, it should be understood that I may employ a group of valves similarly disposed in regard to the other phases of the alternating current supply circuit 9 to effect energy transfer between polyphase alternating current circuits.

Referring now to Fig. 3 of the accompanying drawings, a further embodiment of my invention is diagrammatically illustrated as applied to an electric valve translating system for transmitting energy between an alternating current circuit 80 and a dynamo-electric machine 81 of the synchronous type by means of any suitable electric valve aggregate such as the electric valves 82 to 87, inclusive, of the gaseous type having immersion-ignitor control members 88. The dynamo-electric machine 81 is provided with a plurality of inductive phase windings 89, 90, and 91, an electrical neutral 92, a rotating member 93 and an inductive field winding 94. The electric valves 82-87, inclusive, are energized from the alternating current supply circuit 80 through a transformer 95 having a secondary winding 96 and an electrical neutral 97. Electric valves 82 and 85, 83 and 86, and 84 and 87 serve to energize phase windings 89, 90, and 91, respectively, of machine 81 in a predetermined sequence to establish a rotary field in the machine and to effect thereby rotation of the member 93. The unidirectional current which these groups of valves supply to the respective phase windings is returned from the electrical neutral 92 through the field winding 94 to the electrical neutral 97 of transformer 95 through a conductor 98. To control the conductivity of each of the electric valves 82—87 in accordance with an electrical condition of the supply circuit 80 and the machine 81, such as the voltage of the supply circuit 80 and the voltage of the phase windings 89-91, I employ a plurality of excitation circuits 99-104 inclusive, each of which is associated with a predetermined different one of the electric valves 82-87. For example, the excitation circuit 104 is associated with the electric valve 87. The excitation circuits 99-104, inclusive, are provided with electronic discharge devices 105-110, respectively, preferably of the gaseous type, each having an anode 111, a cathode 112 and control members 113 and 114. Each of these excitation circuits is also arranged similar to the excitation circuits 19 and 20 described in connection with the embodiment of my invention diagrammatically shown in Fig. 1. The excitation circuits 99—104 may be energized from the supply circuit 80 through any suitable phase shifting arrangement such as the rotary phase shifter 115.

To provide means for controlling the conductivity of the electric valves 82 to 87 in accordance with an operating condition, such as the speed of the dynamo-electric machine 81, a distributor mechanism 116 is employed. This distributor may be of the electrical or mechanical type and as shown is of the mechanical type comprising a rotary conducting segment 117 which establishes contact successively with brushes 118, 119, and 120 to effect energization of the proper excitation circuit at a predetermined time relative to the speed and position of the rotating member 93. For example, the brush 118 connects excitation circuits 101 and 104 to the output of the phase shifter 115 through conductors 121 and 122 and undirectional conducting devices 123 and 124. Since the potentials impressed between the anodes of electric valves 84 and 87 are opposite in phase, that is 180 electrical degrees out of phase, it is desirable to effect energization of the associated excitation circuits 101 and 104 only during half cycles of predetermined sign. Since the unidirectional conducting devices 123 and 124 are oppositely disposed, the excitation circuits 101 and 104 are energized during half cycles of opposite polarity of the alternating potential supplied by the phase shifter 115. Similarly, brush 119 is connected to excitation circuits 99 and 102 through a conductor 125 and conductor 121, and brush 120 connects excitation circuits 100 and 103 to the output of phase shifter 115 through a conductor 126 and conductor 121.

In addition to the above mentioned means for controlling the conductivity of the electric valves 82-87 in accordance with an operating condition of the dynamo-electric machine 81, I employ a transformer 127 having primary windings 128 energized in accordance with the voltage of phase windings 89-91, and secondary windings 129-134, inclusive. Secondary windings 129 and 130 of transformer 127 are connected to control members 113 of the electronic devices 107 and 110, respectively, through conductors 135 and 136 to control the energization of control members 113 and hence to control the conductivity of these valves in accordance with an electrical condition of the associated phase winding 91 of machine 81. Similarly, secondary windings 131, 132 and 133, 134 are associated with electronic devices 106, 109 and 105, 108, respectively, through conductors 137-140, respectively.

A switch 141 having stationary contacts 142 and 143 and a movable contact 144 may be employed to render the distributor 116 ineffective by short circuiting the brushes 118—120.

The operation of the embodiment of my invention diagrammatically shown in Fig. 3 may be best explained by considering the operation of the electric translating apparatus when the supply circuit 80 is energized from a source of suitable frequency, such as an ordinary commercial frequency, and the dynamo-electric machine 81 is not rotating. Let it be further assumed that contact 144 of switch 141 engages contact 143 and that the phase of the alternating voltages impressed upon the immersion-ignitor control member 88 of electric valves 82—87 is sufficiently retarded in phase relative to the voltage impressed upon the associated anodes so that the average voltage, and hence the average current, which these valves supply is relatively small and insufficient to cause rotation of the member 93. Under the assumed conditions, the distributor 116 is in a position so that the conducting segment 117 is in contact with brush 118 to effect energization of excitation circuits 101 and 104. Unidirectional current will, therefore, be supplied to phase winding 91 through electric valves 84 and 87, suitable excitation currents for these valves being supplied by excitation circuits 101 and 104 through electronic discharge devices 107 and 110. If the phase of the excitation current supplied by the excitation circuits 101 and 104 be advanced by means of phase shifter 115, the average voltage, and hence the average current, furnished by electric valves 84 and 87 will be increased and since the rotating member 93 of machine 81 is in a torque producing position relative to the phase winding 91, the member 93 will be caused to accelerate at a rate dependent upon the connected load. Assuming that the interactions of the magnetomotive forces of the phase winding 91 and field winding 94 of machine 81 are in the proper directions so that the member 93 rotates in a clockwise direction, the conducting segment 117 of distributor 116 will establish contact with brush 119 to effect energization of excitation circuits 99 and 102, which in turn will render electric valves 82 and 85 conductive to supply unidirectional current to the phase winding 89. In this manner, it will be understood that the distributor 116 effects energization of the proper excitation circuits to render electric valves 82—87 conductive in predetermined sequence to establish the desired periodic energization of the phase windings 89—91 when the rotating member 93 is in a torque producing position relative to the respective phase windings. It should also be noted that the distributor 116 effects transfer or commutation of unidirectional current between the phase windings 89—91, thereby producing the necessary rotating field.

The excitation circuits 99—104 operate to furnish a voltage of suitable magnitude and wave form to the control members 88 of electric valves 82—87 in the proper sequence to render these valves conductive in accordance with the voltage of the supply circuit 80 and in accordance with an operating condition of the dynamo-electric machine 81.

If it is desired to control the conductivity of the electric valves 82—87 by means entirely electrical in nature and operation, the movable member 144 of switch 141 may be placed in contact with stationary members 142 to render the distributor 116 ineffective. Since the transformer 127 is energized in accordance with the voltage of the phase windings 89—91, the conductivity of the electronic devices 105 to 110 will be controlled in accordance with an operating condition of the machine 81 and will also be controlled in accordance with the voltage of the supply circuit 80. The electronic devices 105—110, through the control members 113 and 114, supply current to the immersion-ignitor control members 84 of electric valves 82—87 only during those intervals in which these two conditions are satisfied.

Although in Fig. 3 of the accompanying drawings I have shown my invention as applied to an electric valve translating circuit for transmitting energy between a single phase alternating current circuit and a variable frequency load circuit, it should be understood that my invention in its broader aspects may be applied to electric valve translating circuits generally for transmitting energy between alternating and direct current circuits or between alternating current circuits of variable frequency.

My copending patent application Serial No. 66,432, filed February 29, 1936, describes an electric valve translating system employing an electric valve means of the gaseous type having two control members for conjointly controlling the conductivity of the electric valve means in accordance with two independent electrical conditions; this application is assigned to the assignee of the present application. The electric valve circuits shown in Figs. 1, 2, and 3 are disclosed and claimed in my copending application Serial No. 66,433, filed February 29, 1936, and the electric valve motor control system is disclosed and claimed in my copending application Serial No. 112,042, filed November 21, 1936, both applications being assigned to the assignee of the present application. The present application is made to protect the further invention which the applicant believes to be present in the apparatus set forth in the claims hereof over and beyond the claims set forth in the above mentioned applications.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:—

1. In an electric valve translating circuit for transmitting energy between alternating current circuits of different frequencies, the combination of an electric valve means interconnecting said circuits, and an excitation circuit for controlling the conductivity of said electric valve means comprising electronic discharge means of the gaseous type for conjointly rendering said electric valve means conductive during intervals when predetermined electrical conditions of both of said alternating current circuits are satisfied.

2. In combination, an alternating current supply circuit, an alternating current load circuit, electric valve means of the gaseous type including a control member of the immersion-ignitor type interconnecting said circuits, and an excitation circuit for effecting energization of said immersion-ignitor to render said electric valve means conductive periodically in accordance with predetermined electrical conditions of said supply circuit and said load circuit comprising an electronic discharge device of the gaseous type including an anode, a cathode and two control members, means energized from said supply circuit including a capacitance connected to be discharged through said immersion-ignitor and said electronic discharge device, means associated with said supply circuit and connected to one of said control members tending to render said electronic discharge device conductive in accordance with a predetermined electrical condition of said supply circuit and means associated with said load circuit and connected to the other of said control members of said electronic discharge device for conjointly rendering said electronic discharge device conductive in accordance with the combined predetermined electrical conditions of said supply circuit and said load circuit.

3. In combination, an alternating current supply circuit, an alternating current load circuit, electric valve means employing a control member of the immersion-ignitor type, and an excitation circuit for effecting energization of said immersion-ignitor member to render said electric valve means conductive periodically during predetermined portions of the cycle of alternating potential of said supply circuit and in accordance with predetermined portions of the cycle of alternating potential of said load circuit comprising an electronic discharge device of the gaseous type including an anode, a cathode and two control members, means associated with said load circuit and connected to one of said control members of said electronic discharge device tending to render said device conductive during predetermined portions of the cycle of alternating potential of said load circuit and means associated with the supply circuit and connected to the other of said control members of said electric discharge device for rendering said device conductive during predetermined portions of the cycle of alternating potential of said supply circuit.

4. In combination, an alternating current supply circuit, an alternating current load circuit, electric valve means interconnecting said circuits, and an excitation circuit for conjointly controlling the conductivity of said electric valve means in accordance with predetermined electrical conditions of said supply circuit and said load circuit comprising two serially-connected electronic discharge devices, and means associated with said supply circuit and said load circuit for rendering conductive simultaneously said serially-connected discharge devices in accordance with predetermined electrical conditions of said supply circuit and said load circuit.

5. In combination, an alternating current supply circuit, an alternating current load circuit, electric valve means including an anode, a cathode and a control member of the immersion-ignitor type interconnecting said circuits, an excitation circuit energized in response to the voltage appearing across said anode and said cathode of said electric valve means for controlling the conductivity of said electric valve means comprising two serially-connected electronic discharge devices connected between said anode and said immersion-ignitor, means for rendering one of said electronic discharge devices conductive during predetermined portions of the cycle of alternating potential of said load circuit and means associated with said supply circuit for rendering the other of said electronic discharge devices conductive during predetermined portions of the cycle of alternating potential of said supply circuit.

6. An electric valve converting system comprising a source of alternating current, electric translating apparatus including a plurality of phase windings, a group of electric valves interconnecting said phase windings and said source, a connection between said phase windings and said source, and electronic discharge means for controlling the conductivity of said valves conjointly in accordance with predetermined electrical conditions of said source and said phase windings.

7. An electric valve converting system for transmitting energy between alternating current circuits of different frequencies comprising electric translating apparatus including a plurality of phase windings, a group of electric valves interconnecting said phase windings and one of said circuits, a connection between said phase windings and said one of said circuits, a plurality of electronic discharge means each associated with a different one of said electric valves for controlling the conductivity thereof and each including two control members, and means for impressing on said control members voltages which vary in accordance with controlling influences derived from both of said circuits to control the conductivity of said electronic discharge means conjointly in accordance with said controlling influences.

8. In combination, a pair of alternating current circuits of different frequencies, electric translating apparatus interposed between said circuits comprising a plurality of phase windings for transmitting energy therebetween and a plurality of electric valve means interposed between said phase windings and one of said alternating current circuits for effecting sequential energization of said phase windings, a plurality of electronic discharge means each associated with a different one of said electric valve means and each including a pair of control members, and means for impressing on one of said control members of each of said electronic discharge devices a voltage which varies in accordance with a controlling influence derived from one of said alternating current circuits and for impressing on the other of said control members of each of said electronic discharge devices a potential which varies in accordance with a controlling influence derived from the other of said alternating current circuits to control the conductivity of the associated electric valve means conjointly in accordance with said controlling influences.

9. In combination, an alternating current supply circuit, an alternating current load circuit, electric valve means interconnecting said circuits for transmitting energy therebetween and having a control member, and an excitation circuit for energizing said control member to control the conductivity of said electric valve means conjointly in accordance with a predetermined electrical condition of said supply circuit and in accordance with a predetermined electrical condition of said load circuit comprising electronic discharge means including a plurality of control members, means for impressing on one of said control members a voltage variable in accordance with said electrical condition of said supply circuit and means for impressing on another of said control members a voltage variable in accordance with said electrical condition of said load circuit.

ERNST F. W. ALEXANDERSON.